(12) United States Patent
Labonte et al.

(10) Patent No.: US 11,647,024 B2
(45) Date of Patent: May 9, 2023

(54) PER-INTERFACE ACCESS CONTROL LIST (ACL) COUNTER

(71) Applicant: Arista Networks, Inc., Santa Clara, CA (US)

(72) Inventors: Francois Labonte, Menlo Park, CA (US); Muhammad Yousuf, Cupertino, CA (US)

(73) Assignee: Arista Networks, Inc., Santa Clara, CA (US)

( * ) Notice: Subject to any disclaimer, the term of this patent is extended or adjusted under 35 U.S.C. 154(b) by 151 days.

(21) Appl. No.: 17/348,602

(22) Filed: Jun. 15, 2021

(65) Prior Publication Data

US 2022/0400115 A1 Dec. 15, 2022

(51) Int. Cl.
*H04L 9/40* (2022.01)
*H04L 47/76* (2022.01)
*H04L 47/78* (2022.01)

(52) U.S. Cl.
CPC ............ *H04L 63/101* (2013.01); *H04L 47/76* (2013.01); *H04L 47/781* (2013.01); *H04L 63/0245* (2013.01); *H04L 63/0263* (2013.01)

(58) Field of Classification Search
CPC ..... H04L 63/101; H04L 47/76; H04L 47/781; H04L 63/0245; H04L 63/0263; H04L 43/062
See application file for complete search history.

(56) References Cited

U.S. PATENT DOCUMENTS

| | | | | |
|---|---|---|---|---|
| 9,692,705 | B1* | 6/2017 | Zhou | H04L 47/2433 |
| 11,115,309 | B1* | 9/2021 | Scholl | H04L 43/12 |
| 2009/0138577 | A1* | 5/2009 | Casado | H04L 41/40 709/224 |
| 2018/0302410 | A1* | 10/2018 | Venkataraman | H04L 63/0263 |
| 2021/0336960 | A1* | 10/2021 | Sandler | H04L 12/413 |

* cited by examiner

*Primary Examiner* — Maung T Lwin
*Assistant Examiner* — Suman Debnath
(74) *Attorney, Agent, or Firm* — Fountainhead Law Group P.C.

(57) ABSTRACT

Systems and methods for allocating a per-interface access control list (ACL) counter are disclosed. An ACL is applied to a data packet received at an interface of the network element. In response to matching the highest priority ACL rule, a counter value is obtained based on a combination of a base index and an expansion index value. The base index, expansion index, and counter values are stored in their respective tables. The counter value is uniquely associated with the specific ACL rule hit and the interface used to receive the data packet. Systems and methods also allocate a next set of expansion and counter tables when their storage capacity is exceeded. When the next set of tables are allocated, the older set of tables along with their index mappings and entries are preserved.

20 Claims, 7 Drawing Sheets

PER-INTERFACE ACCESS CONTROL LIST (ACL) COUNTER

FIELD OF INVENTION

Embodiments of the present invention relate to a per-interface access control list (ACL) counter used by a network element for identifying an ACL rule-match on a per-interface basis.

BACKGROUND

The volume of data generated and exchanged has reached an unprecedented level and is expected to continue to grow exponentially. Routers, switches, and other networking devices provide the infrastructure by connecting computers, networks, and electronic devices such that data can be accessed and exchanged between one another. The access and exchange of data also presents security concerns, such as malicious attacks, unauthorized access, and various threats.

One method of preventing attacks or unauthorized access to a networking device or a network is by deploying an access control list (ACL), which is a tool that consists of an ordered series of rules, where each rule has a match criterion and an action. Network devices that implement ACLs admit or deny access to a network or networking device depending on an incoming packet matching a rule of the ACL.

Implementing an ACL in a networking device, such as a router or switch, typically consists of storing a set of ACL rules in a hardware resource such as an associative memory, which may be a Ternary Content Addressable Memory (TCAM).

In operation, a TCAM performs a parallel/simultaneous lookup against the set of ACL rules for an incoming packet, based on a key, to determine if an ACL rule permits or denies the packet's access. The simultaneous comparison of the key is performed against a set of rows containing for each bit a data bit (1 or 0) and a mask (care/don't care shown as "*"), where each row represents one rule of the set of ACL rules. For example, a key of 1011 is allowed for mask bits that include 101*, 1*11, 10**, and denied for the mask bits that contain 1100, 1*01, 0101. If a match against any one of the ACL rules is determined, i.e., a row of mask bits is matched to the key, then the TCAM returns the highest priority match which points to an action, where the action may point to a counter index.

The counter index is used to identify a counter in a counter table. The counter provides a value that is incremented every time a highest priority rule match is determined. The counter acts as a means for monitoring volume of traffic hitting specific ACL rules at the network device where the ACL is implemented. Since associative memory, such as TCAMs, are expensive and consume a lot of power and CPU resources, accurately counting the ACL match hits becomes even more important in a setting where a large-scale ACL, with a large set of rules, is stored in the TCAM. As such, the counter can be a valuable resource in determining whether a particular type of traffic is being filtered by the intended ACL rule and appropriate actions, such as deleting or modifying the rules, can be taken to either reduce the number of rules, thereby reducing the TCAM load, or modifying the ACL rules such that the rule has a higher rate of effectiveness.

Since an ACL can be applied to multiple interfaces of the networking device, a drawback with the current counter incrementing approach is that the counter value only reflects the number of times the ACL rule matched a packet no matter what interface that packet arrived on. Not having such deeper insight on a per interface level prevent visibility into where certain ACLs are matching.

Another drawback of not having such interface specific data hinders in troubleshooting the application of the ACL rule for a specific port which may lead to unintentionally allowing or denying traffic from the specific port.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which.

DETAILED DESCRIPTION

In accordance with some disclosed embodiments, systems, and methods for allocating a per-interface access control list counter to be used by a network element for identifying a specific interface used by an incoming packet and identifying a specific ACL rule applied to it are disclosed.

In accordance with some disclosed embodiments, systems, and methods for allocating and using a per-interface ACL counter are disclosed herein. The per-interface ACL counter provides a deeper insight into the application of an ACL rule for an incoming packet by a) identifying the specific interface of the network element on which the packet was received and b) the specific ACL rule that was applied to incoming packet. The combined information captured and presented by the counter allows better monitoring of the security policies applied on each interface by determining whether the ACL rule is effective to allow or deny the targeted traffic on a per interface basis.

In some embodiments, the method involves receiving a data packet having a header at an interface of the network element. A packet processor adds statistics metadata, such as through an internal header ("internal header"), that includes an interface ID, which identifies the interface that received the packet. In some embodiments, the mechanism to add statistics metadata can be programmed into the pipeline of a packet processor of the network element such that statistics metadata is automatically added to each packet received.

The received packet is screened against an ordered series of rules from an ACL to determine whether to permit or deny the packet's access to its intended destination, or next hop towards the intended destination. The rules of the ACL are stored in the associative memory, such as TCAM, of the network element. Although a TCAM, which is a certain type of associative memory, is discussed, other types of associative memory are also contemplated by the embodiments.

The TCAM includes a match criterion and an action. The rules are applied in parallel by the TCAM to the received data packet by evaluating the data packet header against the ACL rules. An action is taken, also referred to a match-action, based on the highest priority rule that is matched.

In response to an ACL rule being matched, whether it is to permit or deny, an action is taken to obtain a base index value. When the base index is used as the index, it is indexed into a counter table and a counter associated with the counter table is incremented for each hit of the rule thereby providing an aggregate count of the total number of times the rule is hit across all interfaces to which the ACL is applied.

If a match occurs, then the interface ID from the statistics metadata is used to perform a lookup in an expansion table. The expansion table is implemented in a hardware resource of the network element and has a predefined storage capacity that may vary based on the hardware resource used. Once the storage limit is reached, a new expansion table is automatically allocated. For example, the storage capacity may allow the expansion table to hold up to 32 interface IDs.

The lookup associates the interface ID with an expansion index value that is specific to the interface that received the packet. For example, an 8-bit interface ID may be associated with a 5-bit expansion index value that relates to the specific interface.

In some embodiments, the network element includes a counter table that is associated with the expansion table. The counter table is indexed based on both the base index value and the expansion index value. When the counter table index is accessed, an associated counter value is returned. Each counter value is stored as a separate entry in the counter table. Since the counter table is implemented in a hardware resource of the network element, it has a predetermined amount of storage space to store the counter values. For example, in some embodiments, the counter table stores 2000 counter value entries. Once the limit is reached, a new counter table is automatically allocated.

In some embodiments, if either the counter table or the expansion table reaches its storage capacity, then a new set of counter table and expansion table are allocated. As such, every time a new counter table in allocated, a corresponding new expansion table is also allocated and vice versa. The mechanism to allocate the new set of counter table and expansion table can be programmed into the pipeline of the packet processor of the network element such the set of tables are automatically embedded.

As mentioned above, the entries in the counter table are accessed based on both the associated value in the expansion table and the associated base index. For example, a packet that is received at interface 1 will be associated with an expansion index value that is specific to interface 1. The base index value along with the specific expansion index value, is used to access a particular entry in the counter table and update the count.

Likewise, a packet that is received at interface 2 will be associated with a base index value and an expansion index value, where the expansion index value is specific to interface 2. The base index value and an expansion index value are used to access the associated counter value No. 2, which is stored in a specific entry of the counter table that is separate from the entry used to store the counter value for the packet that was received on interface 1. As such, each counter value is associated with a specific interface and a specific ACL rule that was matched thereby providing a deeper insight into the counting of ACL rule matches on a per interface per rule basis.

In another embodiment, the network element performs a storage analysis to determine beforehand the number of counter tables and expansion tables needed to accommodate the flow of traffic through the network element and store associated values. The analysis includes determining the total number of interfaces used by the network element for receiving data packets. The number of ACL rules with unique counters applied to each interface is also determined. The values obtained from the determinations are used to calculate the total storage capacity required to accommodate the total number of interfaces and the total number of ACL counters applied to each interface. For example, N number of interfaces that have an M number of counters applied to them results in a value of M×N number of counter engine entries and M number of expansion table entries.

As part of the storage analysis, the storage capacity of counter table and expansion table is also determined. Since the counter table and expansion table may have their own storage capacity, if the required amount of storage exceeds the amount of storage available in either the counter table or the expansion table to store related data, then a new set of counter table and expansion table would need to be allocated. As such, the analysis determines the total amount of storage required and accordingly determines the total number of counter tables and expansion tables required to accommodate the data related to the number of interfaces and rules applied.

Unlike current approaches which reprogram the existing tables at every reset of the counter thereby losing the previous index mappings and the associated count, the embodiments retain existing programmed index mappings and the count values and allocate additional expansion and counter tables when additional storage space is needed, thereby making the mechanism a hitless mechanism.

Figure 1:
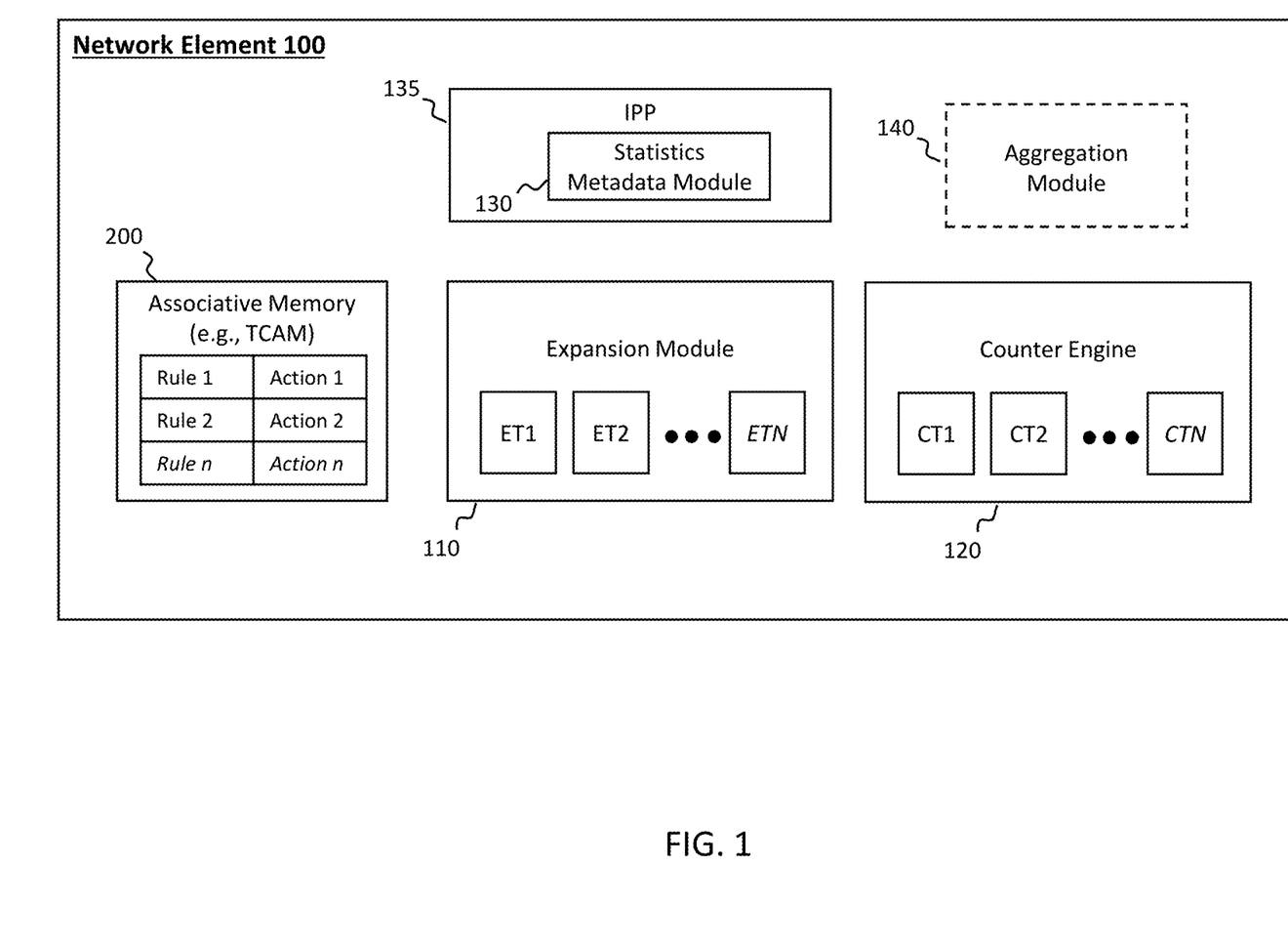
FIG. 1 is a block diagram of a network element and some of its components and modules, in accordance with some embodiments of the disclosure.

FIG. 1 is a block diagram of a network element and some of its components and modules, in accordance with some embodiments of the disclosure. Network element 100 includes an associative memory, such as a Ternary Content Addressable Memory (TCAM) 200, an expansion module 110, a counter engine 120, and a statistics metadata module 130. In some embodiments, the Network Element 100 may also include an aggregation module 140. Although a certain number of modules and components are depicted, network element 100 is not so limited. It is understood that other types of components and modules that include different combinations of network modules and components than shown in FIG. 1, may be employed.

Figure 2:
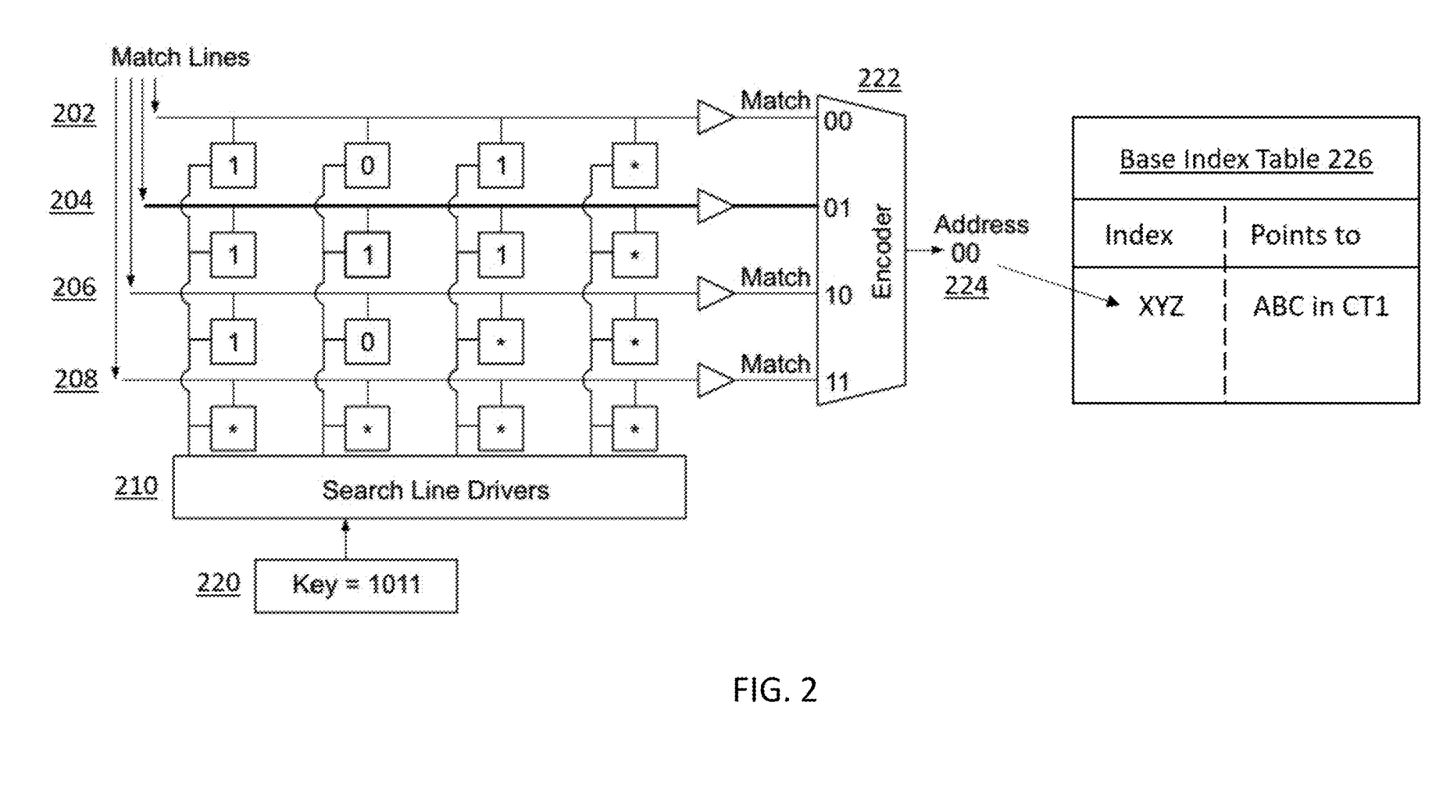
FIG. 2 is an exemplary TCAM used for screening a data packet against an ACL list, in accordance with some embodiments of the disclosure.

TCAM 200 is a type of addressable memory that is application specific. TCAM 200, as explained in more detail in FIG. 2, is used to store an Access Control List (ACL) that may have a plurality of rules. Although a TCAM is described for storing an ACL, other types of associative memory can be used for storing ACLs. The rules are represented in binary form and stored in the TCAM. The rules are applied to an incoming data packet to determine whether the data packet should be granted access to services provided by the network element 100, or access to an electronic device, or next hop connected to the network element. It is used to search an entire list of ACL rules to determine an ACL rule match and then select the highest priority rule match. It is also used for pattern matching to determine if a specific pattern results in a match.

The incoming packet is evaluated against the binary representation of each rule of the ACL to determine a highest priority rule match. For example, if the incoming data packet matches Rule 1, where Rule 1 happens to be the highest priority rule that was matched, then a related Action 1 is performed. Likewise, a match with Rule 2 results in Action 2 and a match with Rule n results in an Action n. Matching a rule means that the rule was applied to the incoming packet, which includes either granting access or denying access to the received data packet.

The network element 100 includes a statistics metadata module 130. In some embodiments, the Ingress Packet Processor (IPP) 135 includes the statistics metadata module 130. When a packet is received at an interface of the network element 100, the statistics metadata module 130 is used to add statistics metadata to the packet, which includes, for example, up to 16-bits of statistics metadata that includes object data, object type, and interface identification of the interface on which the packet was received. This interface may be a physical interface like ethernet3, a port-channel1, or a logical sub-interface like ethernet 3.4. The statistics metadata module 130 inserts an 8-bit ingress port ID into the 16-bit available space. In some embodiments, statistics metadata module 130 may be programmed to automatically add statistics metadata to a data packet received at an ingress of the network element interface.

The network element 100 includes an expansion module 110 that is used for allocating expansion tables (ET1 to ETN). The expansion tables map the 8-bit ingress port ID, which is part of the statistics metadata, to an expansion index value that is unique and specific to the interface on which the packet was received.

The expansion module is a hardware resource of the network element 100 and has a variable storage capacity. In some embodiments, each expansion table, allocated by the expansion module, may have a predetermined storage capacity to hold indexes for a predetermined number of interfaces. For example, each expansion table may have a storage capacity to hold indexes for up to 32 interfaces. Once the storage capacity of an expansion table is reached, the expansion module 110 allocates the next expansion table to accommodate indices for the next predetermined number of interfaces, such as another 32 interfaces that can be accommodated in the next expansion table. As depicted in FIG. 1, the expansion module 110 allocates an expansion table ET1, ET2, to ET/V. The N number of expansion tables are allocated on an as needed basis, where each expansion table is allocated once the predetermined storage capacity of the previous expansion table is reached such that the next set of indexes may be accommodated in next allocated expansion table.

In some embodiments, a determination is made on the number of interfaces used by the network element 100 to receive packets. The number of interfaces used is compared against the storage space available in a first expansion table ET1 to determine if it can store expansion index values for the total number of interfaces used. If the space in the first expansion table ET1 is not adequate, then a second expansion table ET2 is automatically allocated to accommodate the overflow interfaces from the first expansion table. Alternatively, the second expansion table is allocated only after the storage space capacity in the first expansion table has run out or is about to run out.

In some embodiments, if a data packet received at an interface of the network element matches an ACL rule stored in the associative memory, such as a TCAM, then the 8-bit ingress port ID, which is part of the statistics metadata, is used to perform a look-up in the expansion table, such as expansion table ET1. If the lookup is matched with an ingress port ID stored in the expansion table, then a 5-bit expansion index value is returned. The 5-bit expansion index value is associated to the specific interface on which the data packet was received by the network element 100.

Since the expansion table stores ingress port IDs for a predetermined number of interfaces, which is based on its storage capacity, a look-up for an ingress port ID may not be found if the ingress port ID is not within the predetermined number of interfaces stored in the expansion table. For example, if a first expansion table ET1 stores ingress port IDs for interfaces 1-32 and the look-up is for a $33^{rd}$ interface, then the look-up will not match with an ingress port ID stored in the first expansion table ET1. Instead, the look-up will be matched with the second expansion table ET2 that stores ingress port IDs for interfaces 33-64. Only interfaces matched with the expansion tables will return the 5-bit expansion index value.

The network element 100 includes a counter engine 120. The counter engine 120 allocates counter tables that store counter values as separate entries. The counter engine also includes a counter that is used by the base index to keep a count of all the data packets that hit an ACL rule.

The counter engine 120 is a hardware resource of the network element and has a variable storage capacity. In some embodiments, each counter table allocated by the counter engine 120, such as CT1, CT2, and CTN, may have a predetermined storage capacity to hold a predetermined number of counter entries. For example, each counter table may have a storage capacity to hold up to 2000 separate counter entries. Once the storage capacity of a counter table is reached, the counter engine 120 allocates the next counter table to accommodate the overflow counter entries that exceed the capacity of the previous counter table. As depicted in FIG. 1, the counter engine 120 allocates a counter table CT1, CT2 to ETN on an as needed basis, where each counter table is allocated once the predetermined storage capacity of the previous counter table is reached.

In some embodiments, when the next counter table is allocated, the entries of the previous counter table are maintained. For example, the ACL rule matches for interfaces 1-32 in counter table CT1 are maintained and not reprogramed when a new counter table CT2 is allocated. Maintaining the previous entries makes the counter a hitless counter and allows allocation of additional counter tables based on storage needs.

The counter table stores the per interface count, which is accessed based on both the base index value and the expansion index value. Since the base index value is associated with the count or hits of packets that matched a specific ACL rule and the expansion index value is associated with the specific interface at which the data packet was received by the network element, the counter value, which is a combined value of base and expansion index values, provide a deeper insight into the application of an ACL rule for an incoming packet on per-interface basis. Such insight can be used to pinpoint an exact ACL rule match or an interface for troubleshooting or monitoring.

As mentioned earlier, an incoming data packet is evaluated against the binary representation of each rule of the ACL, as stored in the TCAM, to determine a match. If the data packet matches the highest priority ACL rule, regardless of whether it is to permit or deny access of services to the data packet, then a base index value is obtained as a response to the ACL match-action. The base index value is used to access the counter table to increment the count corresponding to the highest priority ACL rule matched thereby providing an aggregate count of the total number of times the rule is hit with the highest priority.

The match-action process is also used to obtain the counter value. This is performed by combining both the base index and the expansion index associated with the same data packet. The expansion index is obtained by looking up the port ID in the statistics metadata corresponding to the packet and using that as an index into the expansion table.

FIG. 2 is an exemplary associative memory, such as a TCAM 200, used for screening a packet against an ACL list, in accordance with some embodiments of the disclosure. Although a TCAM is described, other types of associative memory can also be used. The TCAM 200 includes a comparison circuit to determine a match between a single stored bit and an input key. The comparison circuit also includes a "don't care" wildcards that accepts all values of a bit in the key.

In operation, TCAM 200 is configured to perform a memory lookup based on a key 220. The key may be a binary representation of certain characteristics of the data packet that uniquely identify the data packet. TCAM 200 includes mask rows 202-208 that perform a simultaneous comparison of key 220 to a row of masked bits. As shown in FIG. 2, the masks of TCAM 200 may encode a mask of "1," mask of "0," and mask of "don't care" (shown as "*"). Bit mask "1" will check if the respective bit if key 220 is "1," bit mask "0" will check if the respective bit of key 220 is "0," while the mask "*" will result in a successful check regardless of the bit key value.

All bits of key 220 may be provided to each search line 202-208 via circuits shown as vertical lines in FIG. 1. Each search line will perform a bitwise comparison of the respective bit of key 220 to each respective mask. Each line will produce a "match" signal to encoder 222 when all bits of key 220 match each mask of the search line.

Because search lines include "don't care" masks, more than one match signal may be produced. For example, as shown, key 220 has a value of "1011," which results in a match signal being produced by search lines 202, 206, and 208.

The match signals are then provided to encoder 222. For example, the encoder may receive a match signal for addresses "00," "10" and "11" of TCAM 200. The encoder may arbitrate between match signals based on priority of the addresses where lowest address is given highest priority. Other priority schemes are possible, and they can be based on the address or based on a priority value associated with the entry.

As shown, encoder 222 outputs 224 address of the highest search line that resulted in the match signal (address "00"). In some embodiments, encoder 222 may output a result value associated with the highest priority address that generated a match signal instead of outputting the address number itself.

In some embodiments, the encoder result may trigger a match-action signal to populate the base index table 226 associated with the TCAM 200. The base index table 226 holds an index that points to a counter table. The count may be obtained from an entry in the counter table, that is allocated by a counter engine 120, to which match-action signal points. The count value is a number that is incremented for each hit of the rule thereby providing an aggregate count of the total number of times the rule is hit with the highest priority. For example, as shown in FIG. 2, Index XYZ in the base index table 226 points to an entry ABC in counter table CT1 from where the count value can be obtained.

Figure 3A:
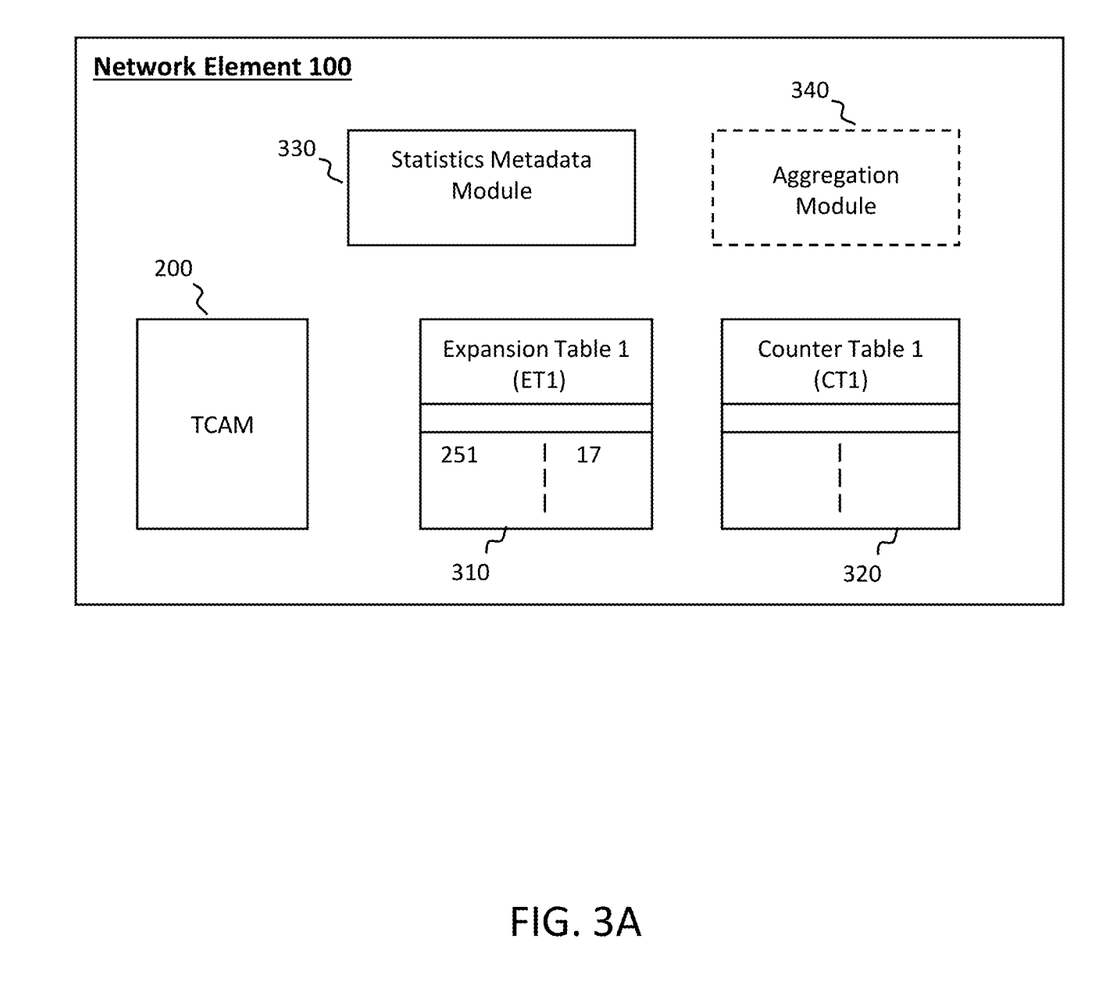
FIG. 3A is a block diagram of a network element having a single expansion and counter table, in accordance with some embodiments of the disclosure.
Figure 3B:
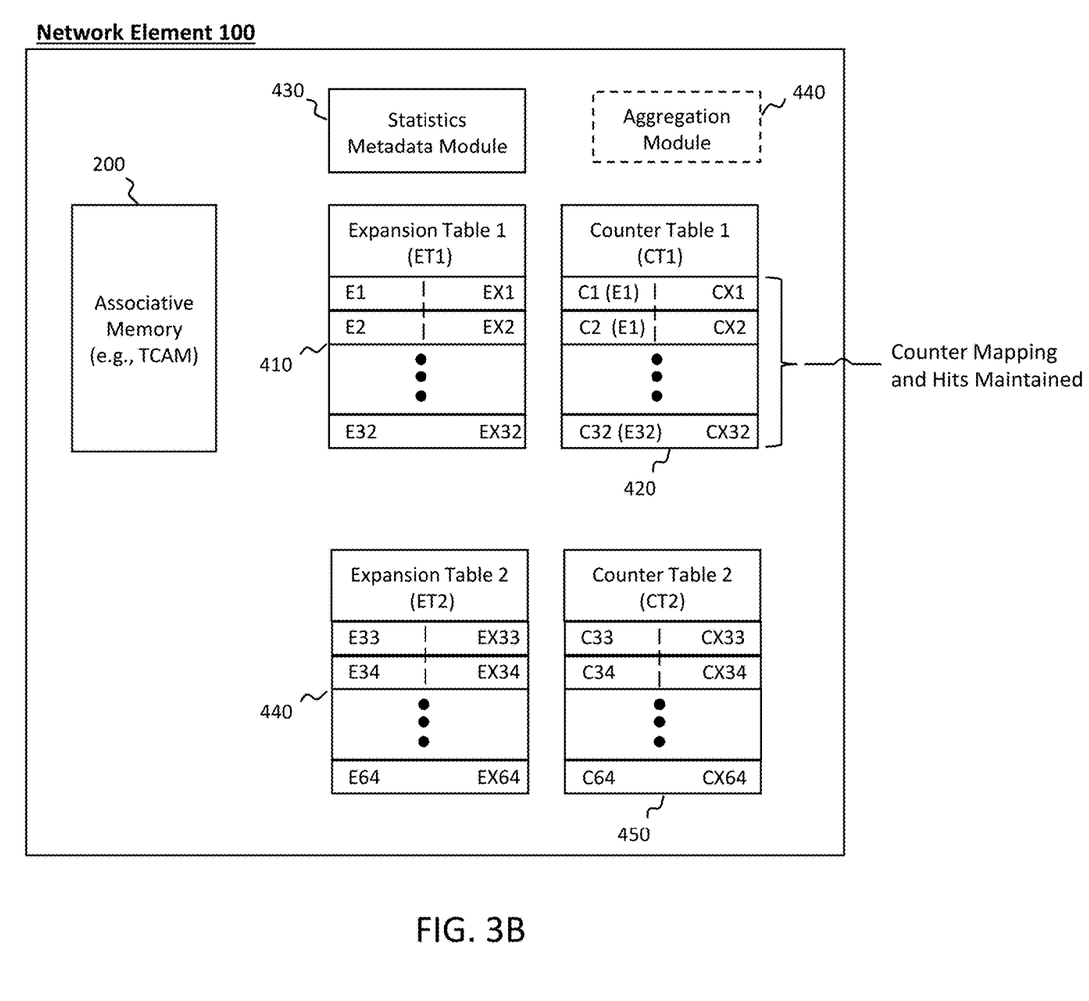
FIG. 3B is a block diagrams of a network element having multiple expansion and counter tables, in accordance with some embodiments of the disclosure.

FIGS. 3A and 3B are block diagrams of a network element and some of its components and modules, in accordance with some embodiments of the disclosure. FIG. 3A is a block diagram of a network element 100 having a single expansion and counter table and FIG. 3B is a block diagram of a network element 100 having multiple expansion and counter tables, in accordance with some embodiments of the disclosure.

Referring to FIG. 3A, each expansion table includes an associated counter table and vice versa. As a data packet is received by an interface of the network element 100, the Statistics and Metadata module adds statistics metadata to the packet and changes the 16-bit statistics metadata into an 8-bit ingress port ID. This 8-bit ingress port ID is used only if the data packet matches at least one ACL rule stored in TCAM 200.

If the data packet matches an ACL rule stored in the TCAM, then an action is taken to 1) obtain the base index value and 2) use the 8-bit ingress port ID to look-up a 5-bit expansion index value from the expansion table 310. If the data packet does not match an ACL rule stored in the TCAM, then it is either dropped or processed without the application of the ACL rule.

If a match is found, as shown in FIG. 2, upon a successful look-up in the expansion table for the ingress port ID, the 8-bit ingress port ID (shown as 251) is mapped to a 5-bit (shown as 17) expansion index value. Either the aggregation module 340, a processor of the network element, or a match-action signal directs the calculation of counter value which comprises adding the base index value to the expansion index value to obtain the counter value.

Referring to FIG. 3B, expansion table ET1 410 and counter table CT1 420 are depicted. Similar to FIG. 3A, once a data packet is received by an interface of the network element 100, the Statistics and Metadata module 430 adds statistics metadata to the packet, which includes an 8-bit ingress port ID. This 8-bit ingress port ID is used only if the data packet matches at least one ACL rule stored in TCAM 200. If the data packet matches a rule, then the action taken includes 1) obtaining a base index value and 2) using the 8-bit ingress port ID to look-up a 5-bit expansion index value from the expansion table 410. For example, 8-bit ingress port ID that is associated with interface E1 will result in a match and return an expansion index value of EX1. Likewise, 8-bit ingress port ID that is associated with interface E2 will result in a match and return an expansion index value of EX2.

If E33, a $33^{rd}$ interface is added to the list of interfaces where the ACL is applied and the counter expansion table ET1, which can hold a maximum of 32 interfaces is already full, then the expansion index module allocates a second expansion table ET2 and populates it with the next set of interfaces, which for now only has interface E33. Likewise, if additional interfaces beyond the $33^{rd}$ interface are added, they are populated in the second expansion table ET2 until the second expansion table ET2 reaches its capacity.

If another expansion table has been allocated, then a look-up is performed in each existing expansion table until a matching ingress port ID for the interface is found. Since the Port Id for a specific interface is mapped exclusively in a specific expansion table, and not in all expansion tables, if a lookup in one expansion table (ET1) results in the port ID not being found, then the entry will be located in the second expansion table (ET2).

In some embodiments, each expansion table is related to a specific counter table and vice versa, e.g., expansion table ET1 410 is related to the counter table CT1 420 and expansion table ET2 440 is related to the counter table CT2 450. The relationship between the expansion table and the counter table includes, for example, each interface entry in the expansion table will have at least one separate entry in the counter table. In some embodiments, when packets that are received by the same interface match separate ACL rules in the TCAM, then the number of separate counter table entries will equal to the number of rules matched such that a count for each rule on a per-interface basis can be counted and tracked.

As shown in counter table CT2 420, interface E1 entry in the expansion table has two separate entries, entry C1 and C2, in the counter table. This means that interface E1 has two different rule matches whose aggregate count value is stored as a separate entry in the counter table CT1 420. The aggregate count index value, as explained earlier, is a combination of both base index value and expansion index value for each rule on a per-interface basis.

Since the expansion table and counter table are related, and each have their own separate predetermined storage limit, if the required amount of storage to store an entry exceeds the amount of storage available in either the counter table or the expansion table, then a new set of counter table and expansion table would need to be allocated. For example, if the storage capacity for the expansion table allows storage of indexes for up to 32 interfaces and the storage capacity for the counter table allows storage of separate aggregate count entries for up to 2000 entries, then new expansion table ET2 440 and counter table CT2 450 would be allocated upon exceeding the limit of either 32 interfaces or 2000 entries. When a new counter table CT2 450 is allocated, the counters and counter hits of the previous counter table CT1 420 are maintained and not reprogrammed such that they can be used by subsequently received packets.

In some embodiments, the mechanisms of allocating expansion tables and counter tables on an as needed basis is a hitless mechanism. This means that instead of reprogramming the previous expansion table or the previous counter table when a next set of expansion table or the previous counter table are allocated, the previous table are maintained such that rule hits and interface data already accumulated in the previous tables is not lost. As such, the hardware is expandible and collapsible on an as needed basis and the expansions through allocation of new tables keeps intact and valid the existing programmed mappings in the previous tables thereby making it a hitless mechanism.

Figure 4:
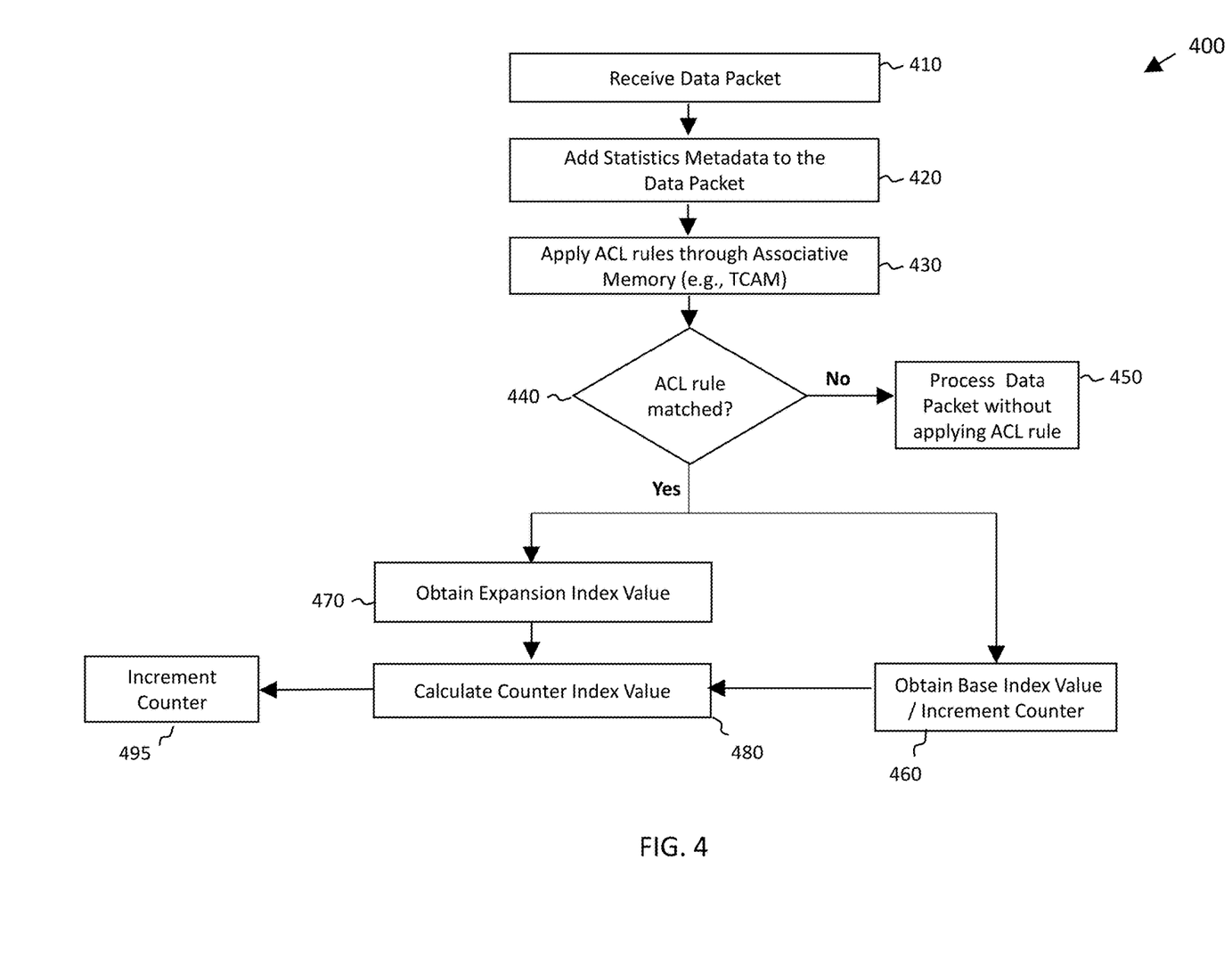
FIG. 4 is a flowchart of a process performed by a network element for calculating an aggregate count of ACL rules matched on a per-interface level, in accordance with some embodiments of the disclosure.

FIG. 4 is a flowchart of a process performed by a network element for calculating a count of ACL rules matched on a per-interface level, in accordance with some embodiments of the disclosure.

Process 400 begins at block 410, where a data packet is received at an ingress interface of a network element. The network element can be a switch, router, hub, bridge, gateway, etc., or another type of packet-receiving and forwarding device. In another embodiment, the network element can also be a virtual machine. The network element may include a plurality of interfaces for receiving the packet. In some embodiments, network elements may include tens or hundreds of interfaces for receiving data packets.

At block 420, statistics metadata is added to the received data packet. The received data packet may include its own routing header that includes its source/destination IP address, source/destination port number, and protocol. The adding of the statistics metadata may be performed by the statistics metadata module of the Ingress Packet Processor (IPP) that is part of the network element.

In some embodiments, the statistics metadata includes object data, object type, and up to 16-bit of statistics metadata, which includes the interface identification of the specific interface on which the packet was received. The IPP adds an 8-bit ingress port ID within the space allotted in the 16-bit statistics metadata. The IPP may also be programmed to automatically add statistics metadata to a data packet received at an ingress of the network element interface.

At block 430, the received data packet is processed to determine if it matches a rule from an access control list (ACL) that is stored in an associative memory, such as a Ternary Content Addressable Memory (TCAM). In response to determining a match at block 440, the highest priority rule from among the matches is selected. In response to determining that the data packet key did not match any of the ACL rules, then at block 450, the data packet is processed without applying the ACL rule, i.e., usual programmed processing of the packet is conducted, which could mean the packet is dropped or the packet is forwarded to its route. As such, services at the network element that require matching of an ACL to grant access will be denied for the data packet that does not match any ACL rule.

At block 440, if a determination is made that data packet key matched at least one rule of the ACL stored in the TCAM, then, an action is taken at block 460 to obtain a base index value. The base index is indexed into a second counter and the counter value is a number that is incremented for each hit of the rule thereby providing an aggregate count of the total number of times the rule is hit.

If a determination is made that data packet key matched at least one rule of the ACL stored in the TCAM, then at block 470, the expansion index value is obtained. In some embodiments, the process to obtain the expansion index value includes using the 8-bit ingress port ID, from the statistics metadata, to perform a look-up in an expansion table. If there are multiple expansion tables, then the look-up is performed in all the expansion tables until a matching port ID that is stored in the expansion table is found.

When a match is found, then the 8-bit ingress port ID is mapped to a 5-bit expansion index value. The 5-bit expansion index value is associated to the specific interface on which the data packet was received by the network element.

At block 480, the counter value is calculated. The counter value is a combination of both base index value and the expansion index value. By combining both values, information relating to the specific ACL rule hit as well as the specific interface at which the packet arrived can be gathered.

Either the aggregation module, a processor of the network element, or a match-action signal directs the calculation of the counter value, which is combination of the base index value+expansion index value.

At block 490, the counter value is incremented to account for subsequent packets that arrived at the same interface and matched with the same rule as the previous data packet for which the counter value was stored.

Figure 5:
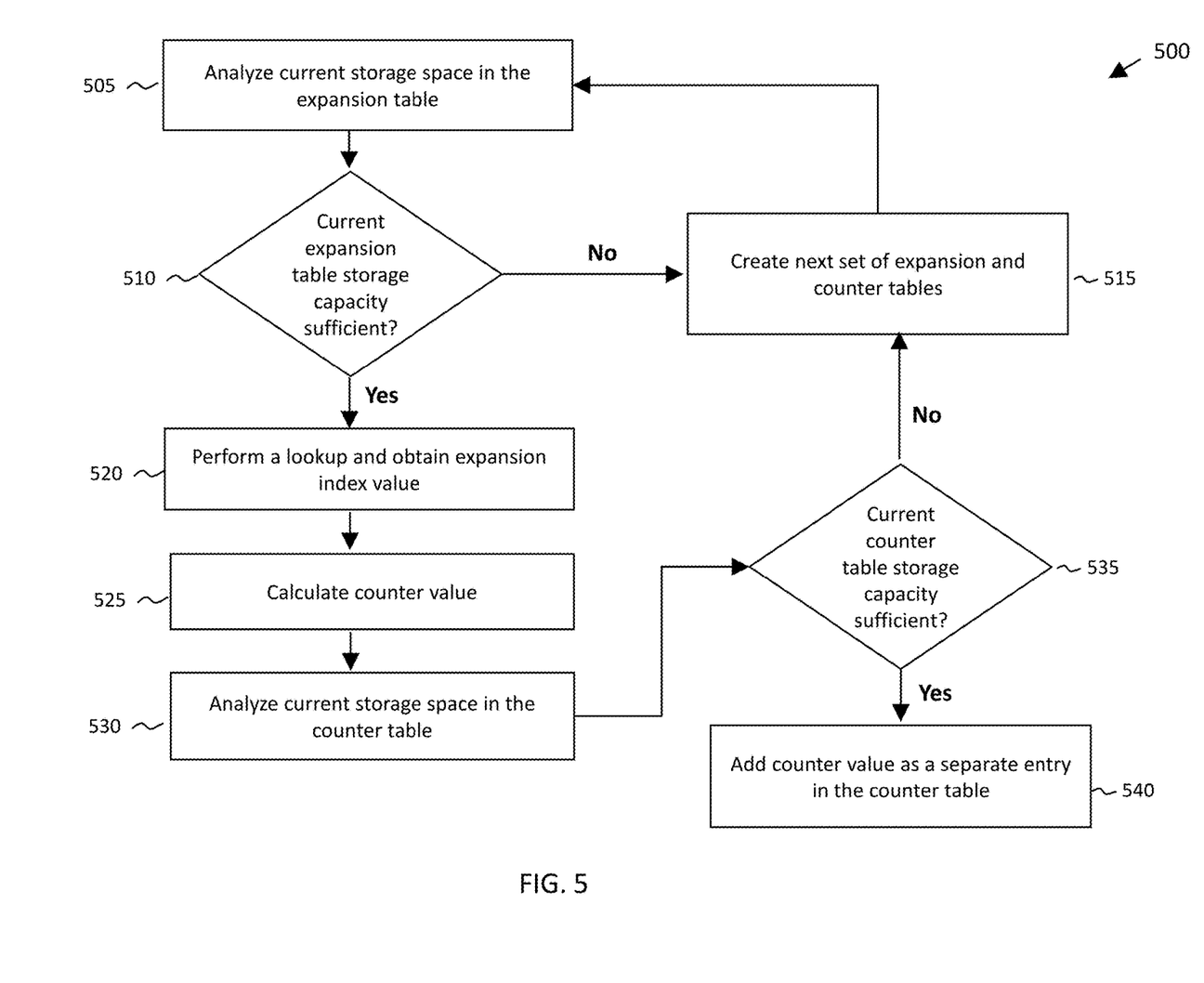
FIG. 5 is a flowchart of a process performed by a network element to determine if a new set of expansion and counter tables needs to be allocated, in accordance with some embodiments of the disclosure.

FIG. 5 is a flowchart of a process performed by a network element to determine if a new set of expansion and counter tables need to be allocated, in accordance with some embodiments of the disclosure. Process 500 uses the systems described in FIGS. 1-4. Specifically, process 500 analyzes the storage capacity of an expansion table to determine if it has enough storage space for storing an expansion index value entry for the next interface and analyzes the storage capacity of a counter table to determine if it has enough storage space for storing the next counter value. If either the expansion table or the counter table does not have enough space to store the next entry, then a new set of expansion and counter tables are allocated.

The process includes, at block 505, analyzing the current storage space in the expansion table. The analysis may be performed at the time an interface is being indexed in the expansion table. Alternatively, the analysis may be performed prior to the interface being indexed in the expansion table to determine if the expansion table has sufficient capacity to store entries relating to the next interface.

At block 510 a determination is made if there is sufficient space to store another index value relating to an interface. If the amount of space is insufficient, then at block 515, a next set of expansion and counter tables are allocated.

Although only the expansion table may be out of storage space, while the counter table still has storage capacity, or vice versa, a new set of both expansion and counter tables are allocated. This is because each expansion table is related to a specific counter table and vice versa. The relationship between the expansion table and the counter table includes, for example, each interface entry in the expansion table will have at least one separate entry in the counter table. In other words, each interface for which an expansion index value is obtained will have a counter value entry in the counter table, which is an aggregate count value that is a combination of both base index value and expansion index value for each ACL rule on a per-interface level. As such, every time a new expansion table is allocated, a corresponding counter table is also allocated and vice versa.

In some embodiments, the expansion table is implemented in a hardware resource of the network element and has a predefined storage capacity that may vary based on the hardware resource used. Once the storage limit is reached, a new expansion table is automatically allocated. For example, the storage capacity may allow the expansion table to hold entries for up to 32 interfaces. If a 33$^{rd}$ expansion index entry is to be populated, then a next set of expansion and counter tables will be allocated.

At block 510, if the amount of space is sufficient to accommodate the storing of entries related to the next interface, then at block 520, a look-up is performed to obtain the expansion index value associated with the interface that received the data packet.

The process of looking up includes using the 8-bit ingress port ID to look-up a matching port ID stored in the expansion table. If the port ID is not found in the first expansion table, and multiple expansion tables exist, then a look-up is performed for each existing expansion table until a matching ingress port ID for the interface is found.

When a matching port ID is found, then a 5-bit expansion index value that is mapped to the 8-bit ingress port ID is obtained. The 5-bit expansion index value is associated with the specific interface on which the data packet was received by the network element.

At block 525, a counter value is calculated. The calculation process can be performed by an aggregation module, a processor of the network element, or a match-action signal that directs the calculation to be performed. The counter value is a combination of the base index value+expansion index value, where the base index value is specific to the ACL rule hit and the expansion index value is specific to the interface at which the packet arrived. Once calculated, the counter value is incremented such that it can account for a subsequent packet that arrives at the same interface and matches with the same rule as the previous data packet.

At block 530, a determination is made if the counter table has enough storage capacity to store the next counter value. Since the counter table is implemented in a hardware resource of the network element, it has a predetermined amount of storage space to store the counter values. For example, in some embodiments, the counter table stores 2000 entries.

At block 535, if the counter table does not have enough storage space to store the counter value, then at block 515 a new set of expansion and counter tables are allocated, and the process is repeated from block 505.

If the counter table does have enough storage space to store the counter value, then at block 540, the counter value is stored as a separate entry in the counter table.

Although process 500 depicts evaluating storage space of expansion table in blocks 505 and 510 before evaluating storage space of counter table in blocks 530 and 535, the order may be switched such that counter table storage space is evaluated before expansion index storage space.

Figure 6:
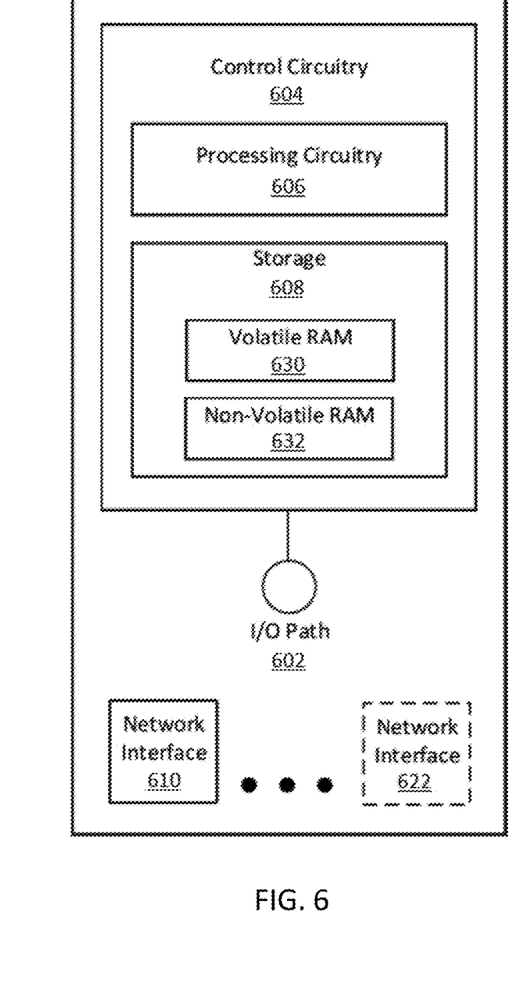
FIG. 6 is a block diagram of a network element and its components, in accordance with some embodiments of the present disclosure.

FIG. 6 is a block diagram of a network element and its components, in accordance with some embodiments of the present disclosure. Device 600 may be a network device as shown in FIGS. 1, 3A, and 3B (e.g., network element 100). Device 600 may be a switch (e.g., a layer 2 or layer 3 switch), a network controller, and/or any other computing device that may be configured to receive data packets, process them through an ACL stored in an associative memory, such as a TCAM, and calculate a counter value. Device 600 may receive data via an input/output (I/O) path 602. I/O path 602 may provide an ACL to control circuitry 604, which includes processing circuitry 606 and storage 608. Storage 608 may include volatile random-access memory (RAM) 630, which does not retain its contents when power is turned off, and non-volatile RAM 632, which does retain its contents when power is turned off. Control circuitry 604 may send and receive commands, requests, and other suitable data using I/O path 602. I/O path 602 may connect control circuitry 604 (and specifically processing circuitry 606) to one or more network interfaces 610 to 622, which in turn connect device 600 to one or more network devices.

Control circuitry 604 may be based on any suitable processing circuitry, such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 604 executes instructions for adding statistics metadata to a packet, adding an 8-bit metadata within the allotted 16-bit space in the statistics metadata, screening a data packet against ACL rules sored in a TCAM, obtaining base index value, obtaining expansion index value, calculating counter value, determining storage space in an expansion or counter index table, and allocating expansion and counter index tables. For example, control circuitry 604 may receive a data packet via network interface 610, store the base index value obtained for the data packet based on the ACL rule matched specific to the interface at which it was received in storage 608 (i.e., volatile RAM 630).

Storage 608 may be an electronic storage device that is part of control circuitry 604. As referred to herein, the phrase "electronic storage device" or "storage device" should be understood to mean any device for storing electronic data, computer software, instructions, and/or firmware, such as RAM, content-addressable memory (CAM), hard drives, optical drives, solid state devices, quantum storage devices, or any other suitable fixed or removable storage devices, and/or any combination of the same. The circuitry described herein may execute instructions included in software running on one or more general purpose or specialized processors. Multiple circuits may be provided to handle simultaneous processing functions.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

The invention claimed is:

1. A method of implementing an access control list (ACL) counter in a network element, the method comprising:
receiving a data packet at an interface of the network element, wherein metadata is associated with the data packet;
determining whether a search key associated with the data packet matches at least one rule from a plurality of rules stored in an associate memory of the network element; and
in response to determining a match between the search key and the at least one rule from the plurality of rules stored in the associative memory:
selecting a matched rule based on a priority;
obtaining a base index, wherein the base index is associated with the matched rule;
selecting an expansion index based on the metadata of the received data packet, wherein the expansion index is associated with the interface of the network element that received the data packet;
using a combination of the base index and the expansion index to select a counter in a counter table; and
updating the counter in the counter table.

2. The method of claim 1, further comprising:
adding statistics metadata to the data packet, wherein the statistics metadata includes interface ID of the interface of the network element that received the data packet; and
using the interface ID to select the expansion index.

3. The method of claim 1, wherein the base index is indexed into a second counter, wherein the second counter is incremented when the data packet matches a rule from the plurality of rules stored in the associative memory.

4. The method of claim 1, wherein each counter table is associated with an expansion table.

5. The method of claim 1, wherein the counter table has predetermined storage space available for storing counter values.

6. The method of claim 5, wherein a second counter table is automatically allocated when the counter table reaches its predetermined storage space.

7. The method of claim 6, wherein a second expansion table is automatically allocated in response to an allocation of the second counter table.

8. The method of claim 1, wherein the expansion index is indexed into an expansion table which has a predetermined amount of storage space for storing expansion values, and the counter table has a predetermined amount of storage space for storing counter values, and
if the storage space required to store the expansion values exceeds the predetermined amount of storage space in the expansion table or if the storage space required to store the counter values exceeds the predetermined amount of storage space in the counter table, then a new expansion table and a new counter table are automatically allocated.

9. The method of claim 8, further comprising, upon allocating the new expansion table and the new counter table, retaining the values stored in existing expansion and counter tables.

10. A method of automatically allocating one or more set of tables in a network element, the method comprising:
receiving a plurality of data packets, wherein each data packet from the plurality of data packets is received at a different interface of the network element;
determining whether each data packet matches at least one highest priority rule from an access control list (ACL), wherein the ACL comprises a plurality of rules that are stored in an associative memory of the network element; and
in response to determining a plurality of matches between a subset of the plurality of data packets received and the ACL:
calculating the total number of matched data packets;
for each matched data packet, obtaining a base value by using a base index and an expansion value by using an expansion index, wherein the expansion index is indexed to an expansion table that stores a predetermined number of expansion values;
using a combination of the base value and the expansion value to select a counter in a counter table, wherein the counter table stores a predetermined number of counter values;
in response to determining that either the expansion table does not have storage capacity to store expansion values for the total number of matched data packets or the counter table does not have storage capacity to store counter values for number of matched data packets:

automatically allocating a second counter table and a second expansion table; and utilizing the second counter table and the second expansion table for storing the expansion values and the counter values that exceed the storage capacity of the counter table and the expansion table.

11. The method of claim 10, wherein the base index is associated with the highest priority matched rule.

12. The method of claim 10, further comprising, upon allocating the second expansion table and the second counter table, retaining index mappings and count values previously stored in the expansion table and counter table.

13. The method of claim 10, further comprising:
adding statistics metadata to the data packet, wherein the statistics metadata includes interface ID of the interface of the network element that received the data packet; and using the interface ID to select the expansion table.

14. A network device comprising:
an interface configured to receive a data packet; and
control circuitry configured to:
 receive a data packet at an interface of the network element, wherein metadata is associated with the data packet;
 determine whether a search key associated with the data packet matches at least one rule from a plurality of rules stored in an associate memory of the network element; and
 in response to determining a match between the search key and the at least one rule from the plurality of rules stored in the associative memory:
  select a matched rule based on a priority;
  obtain a base index, wherein the base index is associated with the matched rule;
  select an expansion index based on the metadata of the received data packet, wherein the expansion index is associated with the interface of the network element that received the data packet;
  use a combination of the base index and the expansion index to select a counter in a counter table; and
  update the counter in the counter table.

15. The network device of claim 14, further comprising:
adding statistics metadata to the data packet, wherein the statistics metadata includes interface ID of the interface of the network element that received the data packet; and using the interface ID to select the expansion index.

16. The network device of claim 14, wherein the control circuitry is configured to index the base index into a second counter, wherein the second counter is incremented when the data packet matches a rule from the plurality of rules stored in the associative memory.

17. The network device of claim 14, wherein the counter table has predetermined storage space available for storing counter values.

18. The network device of claim 17, wherein the control circuitry is configured to automatically allocate a second counter table when the counter table reaches its predetermined storage space.

19. The network device of claim 18, wherein the control circuitry is configured to automatically allocate a second expansion table in response to allocating the second counter table.

20. The network device of claim 14, wherein the expansion index is indexed into an expansion table which has a predetermined amount of storage space for storing expansion values and the counter table has a predetermined amount of storage space for storing counter values; and
 if the storage space required to store the expansion values exceeds the predetermined amount of storage space in the expansion table or if the storage space required to store the counter values exceeds the predetermined amount of storage space in the counter table, then the control circuitry is configured to automatically allocate a new expansion table and a new counter table.

* * * * *